United States Patent
Holtmanns et al.

(10) Patent No.: US 10,791,456 B2
(45) Date of Patent: Sep. 29, 2020

(54) METHOD AND APPARATUS FOR MANAGING COMMUNICATIONS WITH MULTIPLE IDENTIFICATION PROFILES

(71) Applicant: Nokia Technologies Oy, Espoo (FI)

(72) Inventors: Silke Holtmanns, Klaukkala (FI); Chaitra Shanthappa, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/030,121

(22) PCT Filed: Oct. 22, 2013

(86) PCT No.: PCT/IB2013/059546
§ 371 (c)(1),
(2) Date: Apr. 18, 2016

(87) PCT Pub. No.: WO2015/059518
PCT Pub. Date: Apr. 30, 2015

(65) Prior Publication Data
US 2016/0269889 A1 Sep. 15, 2016

(51) Int. Cl.
*H04B 1/38* (2015.01)
*H04W 8/18* (2009.01)
*H04W 8/20* (2009.01)

(52) U.S. Cl.
CPC .......... *H04W 8/18* (2013.01); *H04W 8/183* (2013.01); *H04W 8/20* (2013.01)

(58) Field of Classification Search
CPC .................................................. H04W 88/06
See application file for complete search history.

(56) References Cited

U.S. PATENT DOCUMENTS

2006/0142012 A1 6/2006 Kirchhoff et al.
2007/0111714 A1 5/2007 Edwards
(Continued)

FOREIGN PATENT DOCUMENTS

| CN | 101507270 A | 8/2009 |
| CN | 102027730 A | 4/2011 |

(Continued)

OTHER PUBLICATIONS

International Search Report and Written Opinion received for corresponding Patent Cooperation Treaty Application No. PCT/IB2013/059546, dated Oct. 22, 2013, 9 pages.
(Continued)

*Primary Examiner* — Barry W Taylor
(74) *Attorney, Agent, or Firm* — Alston & Bird LLP

(57) ABSTRACT

A method, apparatus and computer program product are provided to selectively accept requests for communication that may be supported by different identification profiles with the selective acceptance being based upon a predefined criteria, such as the cost of the communications. In the context of a method, a request for communications is received from a network operator. The communications with the network operator are supported by a first of a plurality of identification profiles. The method also includes determining, relative to a predefined criteria, whether the communications should be supported by the first identification profile or by another identification profile configured to support communications with another network operator. In an instance in which the communications should be supported by another identification profile, the method causes the request for communications to be denied.

20 Claims, 3 Drawing Sheets

(56) References Cited

U.S. PATENT DOCUMENTS

| | | | |
|---|---|---|---|
| 2007/0254646 A1* | 11/2007 | Sokondar | H04W 8/183 455/432.1 |
| 2008/0261603 A1 | 10/2008 | Sever et al. | |
| 2009/0061932 A1* | 3/2009 | Nagarajan | H04M 1/72519 455/558 |
| 2010/0240414 A1 | 9/2010 | Ran | |
| 2012/0115545 A1* | 5/2012 | Middleton | H04M 1/72563 455/558 |
| 2013/0040618 A1* | 2/2013 | D'amato | H04M 1/72522 455/414.1 |
| 2013/0142056 A1* | 6/2013 | Abplanalp | H04W 8/18 370/252 |
| 2013/0165095 A1 | 6/2013 | Fighel | |
| 2013/0196621 A1* | 8/2013 | Guday | H04L 43/045 455/406 |
| 2014/0171038 A1* | 6/2014 | Singvall | H04W 4/16 455/414.1 |
| 2016/0269889 A1 | 9/2016 | Holtmanns et al. | |

FOREIGN PATENT DOCUMENTS

| | | |
|---|---|---|
| CN | 102348179 A | 2/2012 |
| EP | 2282587 A1 | 2/2011 |
| EP | 2384061 A2 | 11/2011 |
| JP | 6106568 B2 | 4/2017 |
| KR | 2003-0000650 A | 1/2003 |
| KR | 2012-0060345 A | 6/2012 |
| WO | WO 2013/096768 A2 | 6/2013 |
| WO | 2013/124708 A1 | 8/2013 |

OTHER PUBLICATIONS

Office action received for corresponding Vietnam Patent Application No. 1-2016-01289, dated May 25, 2016, 2 pages of office action and 1 page of translation available.

Office action received for corresponding Korean Patent Application No. 2016-7013340, dated Feb. 10, 2017, 4 pages of office action and no page of translation available.

Extended European Search Report received for corresponding European Patent Application No. 13896103.2, dated Apr. 20, 2017, 7 pages.

Office Action for Phillipines Application No. 1/2016/500694, dated Apr. 26, 2018, 2 pages.

Office Action for Chinese Application No. 201380080417.7 dated Jun. 27, 2018.

Office Action for Chinese Application No. 201380080417.7 dated Mar. 4, 2019, 3 pages.

Office Action for India Application No. 201647017541 dated Aug. 19, 2019.

Office Action for Indonesian Application No. P00201603354 dated Sep. 25, 2019.

Office Action for Vietnamese Application No. 1-2016-01289 dated Apr. 29, 2020, 4 pages.

* cited by examiner

METHOD AND APPARATUS FOR MANAGING COMMUNICATIONS WITH MULTIPLE IDENTIFICATION PROFILES

RELATED APPLICATION

This application was originally filed as Patent Cooperation Treaty Application No. PCT/IB2013/059546 filed Oct. 22, 2013.

TECHNOLOGICAL FIELD

An example embodiment of the present invention relates generally to a method and apparatus for managing communications with multiple communication profiles and, more particularly, to a method and apparatus for selectively managing requests for communications from a plurality of network operators that are supported by a plurality of identification profiles.

BACKGROUND

Some users of mobile terminals may have subscriptions with each of several network operators. Each subscription may uniquely identify the mobile terminal to the respective network operator. A subscription may also define the communications that may be supported by the respective network operator. In this regard, a subscription may define the costs associated with communications that may be conducted by the mobile terminal with the support of the respective network operator.

In order to support communications with the different network operators, a mobile terminal may include a plurality of identification profiles. Those identification profiles might be stored on one secure module or might be stored on a multitude of modules, such a eUICC (embedded universal integrated circuit card), subscriber identity module (SIM) card, or secure element. Each identification profile may identify the mobile terminal with respect to the network operator associated with a respective subscription to which the profile relates. In addition, each identification profile may define other parameters associated with the communications supported by the respective network operator that may be conducted pursuant to the respective subscription.

In response to a request for communications from a first network operator, a mobile terminal that includes a plurality of identification profiles may identify the identification profile associated with the subscription with the first network operator and may then accept the request for communications pursuant to the parameters defined by the associated identification profile. Subsequently, the mobile terminal may receive another request for communications from a second network operator. The mobile terminal may similarly identify another identification profile associated with the subscription with the second network operator and may then accept the request for communications in accordance with the parameters defined by the other identification profile.

As a result of the different subscriptions with the different network operators, the user of the mobile terminal may be charged differently for the communications supported by the different network operators. For example, in instances in which at least some of the requests for communications are provided by a network operator pursuant to a subscription that charges a greater price for the communication services than the price associated with communication services provided by other network operators pursuant to other subscriptions, the resulting expense incurred by the user of the mobile terminal may be greater than if a greater percentage of the requests for communications had been delivered by other network operators pursuant to other, less expensive subscriptions.

BRIEF SUMMARY

A method, apparatus and computer program product are provided in accordance with an example embodiment in order to selectively accept requests for communication that may be supported by different identification profiles with the selective acceptance being based upon a predefined criteria, such as the cost of the communications. As such, the method, apparatus and computer program product of an example embodiment may permit a mobile terminal to more effectively manage subscriptions with a plurality of different network operators in accordance with the predefined criteria. For example, the method, apparatus and computer program product of an example embodiment may selectively accept requests for communication based upon the subscriptions with the different network operators so as to reduce the overall costs associated with communications.

In an example embodiment, a method is provided that includes receiving a request for communications from a network operator. The communications with the network operator are supported by a first of a plurality of identification profiles. The method also includes determining relative to a predefined criteria whether the communications should be supported by the first identification profile or by another identification profile configured to support communications with another network operator. In an instance in which the communications should be supported by another identification profile, the method causes the request for communications to be denied.

In an instance in which the communications should be supported by another identification profile, the method may also include causing information to be provided to a requestor who initiated the request for communications. In this example embodiment, the information may relate to the communications from another network operator that is supported by the another identification profile. In this regard, each of the plurality of identification profile may be associated with a subscription with a respective network operator. As such, the method of this example embodiment may cause information to be provided to the requestor by causing information relating to the subscription associated with another identification profile to be provided to the requestor in an instance in which the communication should be supported by the another identification profile. For example, the method may cause information relating to the subscription associated with the another identification profile to be provided by causing an electronic message, such as a text message, instant message (IM), multimedia message service (MMS) message or chat message, to be provided to the requestor with information relating to the subscription associated with the another identification profile.

The predefined criteria may include a cost associated with the communications supported by the first identification profile and by another identification profile. In an example embodiment, the method may receive the request for communications by receiving information identifying the network operator within the request. In another example embodiment, the method may also include receiving an electronic message associated with the request for communications that identifies the network operator.

In another example embodiment, an apparatus is provided that includes at least one processor and at least one memory including computer program code with the at least one memory and computer program code configured to, with the processor, cause the apparatus to receive the request for communications from a network operator. The communications with the network operator are supported by a first of a plurality of identification profiles. The at least one memory and the computer program code are also configured to, with the processor, cause the apparatus of this example embodiment to determine relative to a predefined criteria whether the communications should be supported by the first identification profile or by another identification profile configured to support communications from another network operator. In an instance in which the communications should be supported by another identification profile, the at least one memory and computer program code are configured to, with the processor, cause the apparatus of this example embodiment to cause a request for communications to be denied.

The at least one memory and the computer program code may be further configured to, with the processor, cause the apparatus of an example embodiment, in an instance in which the communications should be supported by another identification profile, to cause information to be provided to a requestor who initiated the request for communications. The information may relate to the communications from another network operator that are supported by the another identification profile. Each of the plurality of identification profiles may be associated with a subscription with a respective network operator. In this example embodiment, the at least one memory and computer program code may be configured to, with the processor, cause the information to be provided to the requestor by causing information relating to the subscription associated with the another identification profile to be provided to the requestor in an instance in which the communications should be supported by the another identification profile. The at least one memory and computer program code may be configured to, with the processor, cause the apparatus of an example embodiment to cause information relating to the subscription associated with the another identification profile to be provided by causing an electronic message, such as a text message, IM, chat message, MMS message, etc., to be provided to the requestor with information relating to the subscription associated with the another identification profile.

The predefined criteria may include a cost associated with the communications supported by the first identification module and by another identification profile. The at least one memory and computer program code may be configured to, with the processor, cause the apparatus of an example embodiment to receive the request for communications by receiving information identifying the network operator within the request. The at least one memory and the computer program code may be further configured to, with the processor, cause the apparatus of another example embodiment to receive an electronic message associated with the request for communications that identifies the network operator.

In a further example embodiment, a computer program product is provided that includes a non-transitory computer readable medium having program code portions stored thereon with the program code portions configured, upon execution, to receive a request for communications from the network operator. The communications with the network operator are supported by a first of a plurality of identification profiles. The program code portions are also configured to determine relative to a predefined criteria whether the communications should be supported by the first identification profile or by another identification profile configured to support communications from another network operator. In an instance in which the communications should be supported by another identification profile, the program code portions are configured to cause the request for communications to be denied.

The program code portions of an example embodiment may also be configured to, in an instance in which the communications should be supported by another identification profile, cause the information to be provided to a requestor who initiated the request for communications. The information may relate to the communications from another network operator that are supported by the another network operator. Each of the plurality of identification profiles may be associated with a subscription with a respective operator. In this example embodiment, the program code portions may be configured to cause information to be provided to the requestor in an instance in which the communication should be supported by another identification profile. The program code portions of an example embodiment may also be configured to cause information relating to the subscription associated with another identification profile to be provided to the requestor with the information relating to the subscription associated with the another identification profile. In an example embodiment, the predefined criteria may include a cost associated with the communications supported by the first identification profile and by another identification profile.

In yet another embodiment, an apparatus is provided that includes means for receiving a request for communications from the network operator. The communications with the network operator are supported by a first of a plurality of identification profiles. The apparatus also includes means for determining relative to a predefined criteria, such as cost, whether the communications should be supported by the first identification profile or by another identification profile configured to support communications from another network operator. In an instance in which the communications should be supported by another identification profile, the apparatus includes means for causing the request for communications to be denied.

BRIEF DESCRIPTION OF THE DRAWINGS

Figure 1:
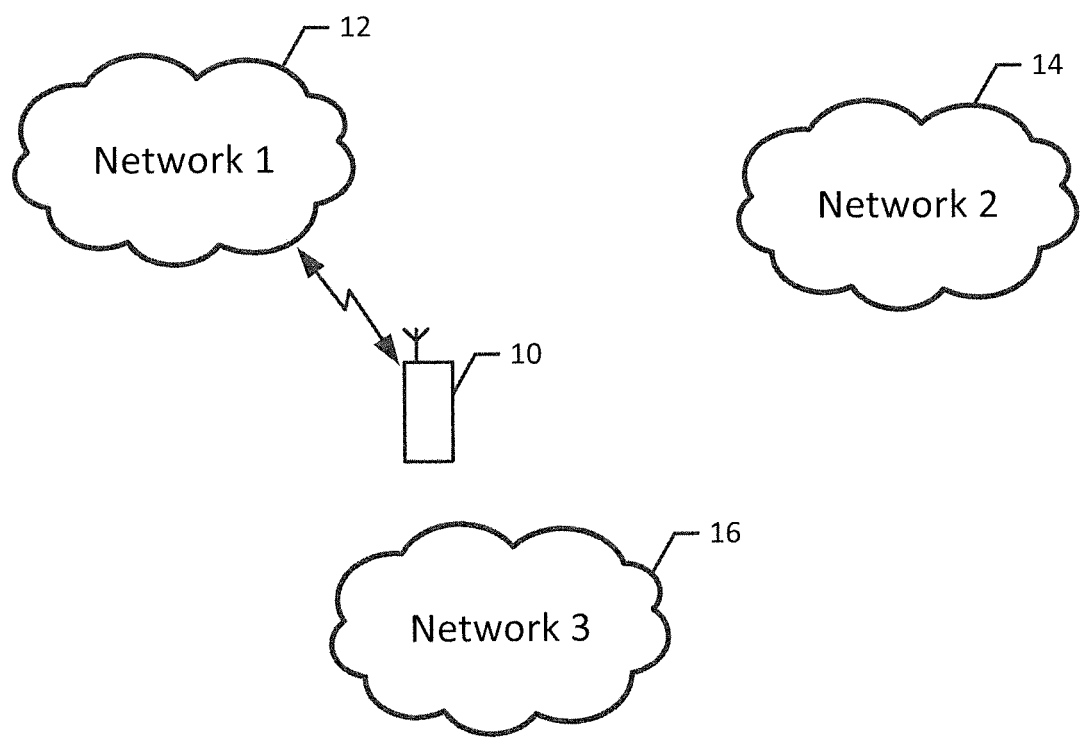
Figure 2:
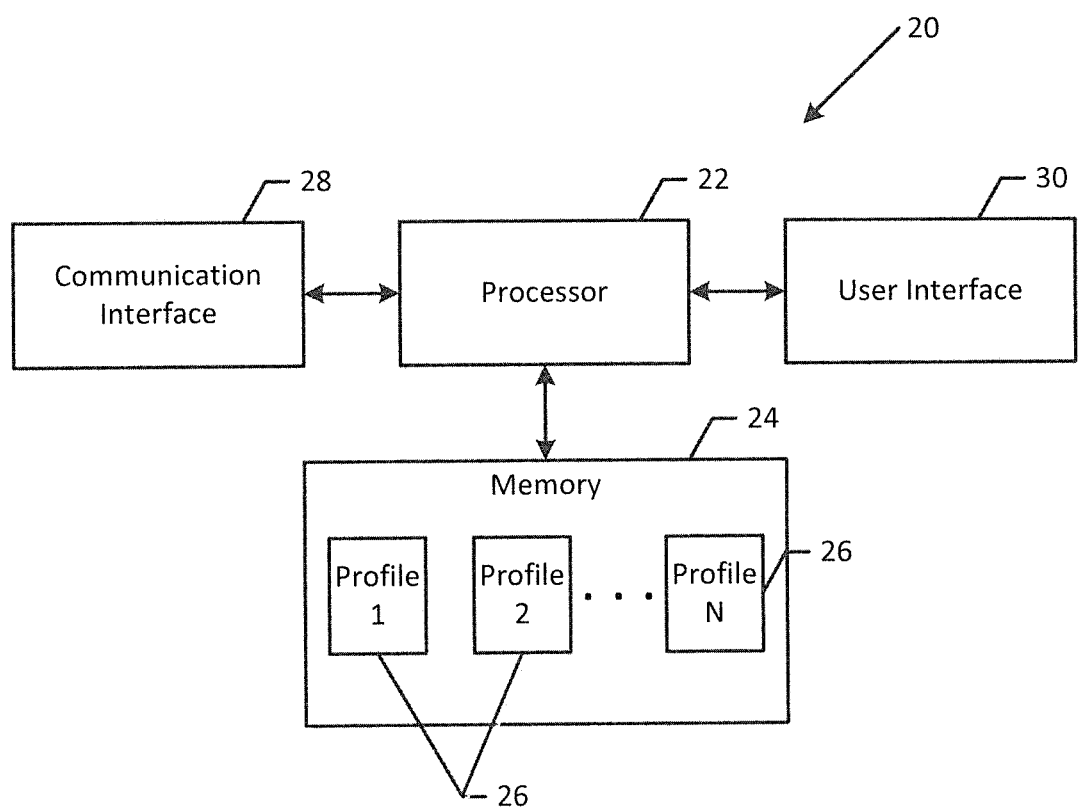
Figure 3:
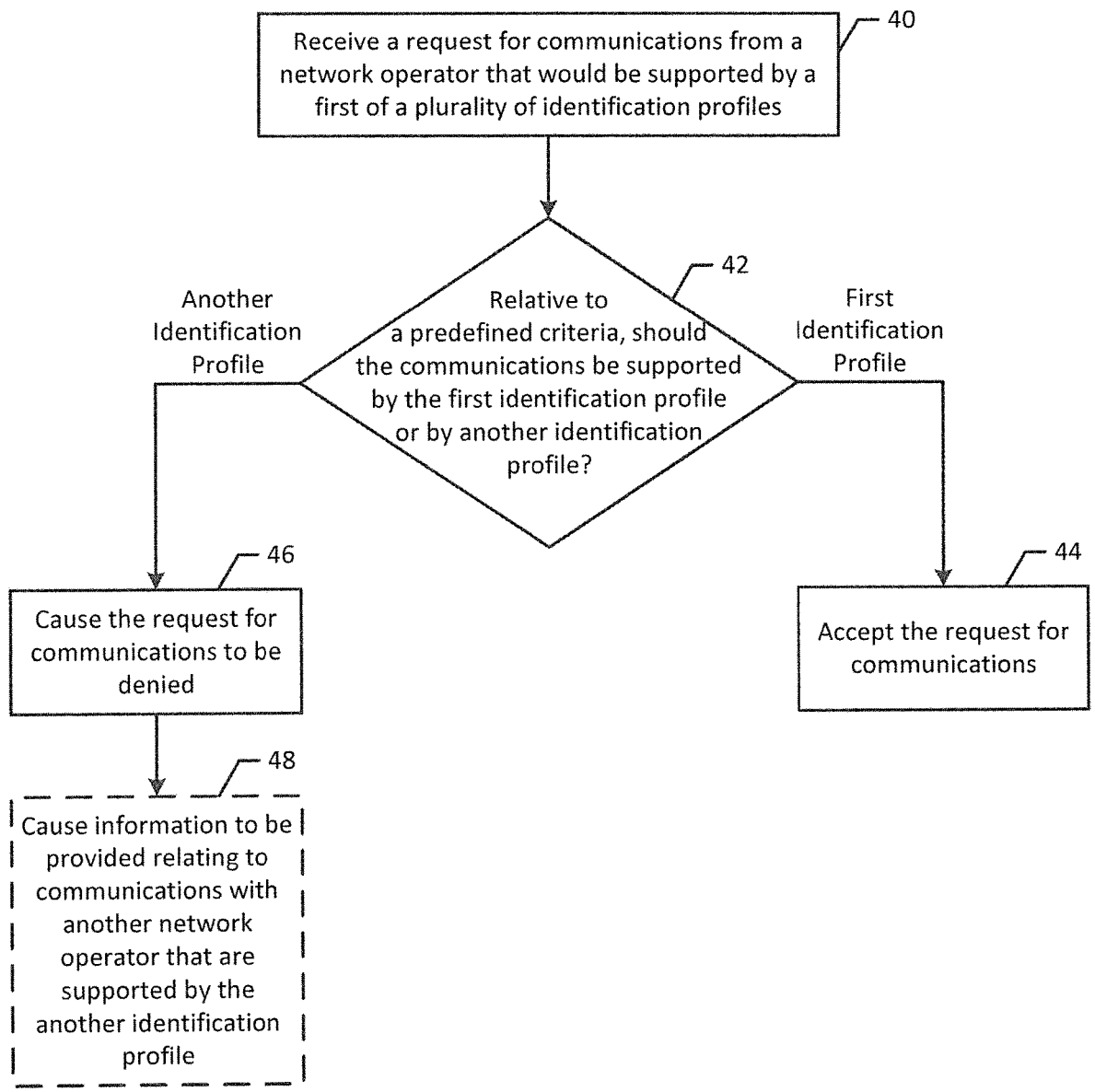

Having thus described example embodiments of the invention in general terms, reference will now be made to the accompanying drawings, which are not necessarily drawn to scale, and wherein:

FIG. 1 is a schematic representation of a mobile terminal that may be serviced by a plurality of networks:

FIG. 2 is a block diagram of an apparatus that may be specifically configured in accordance with an example embodiment of the present invention: and FIG. 3 is a flow chart illustrating operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A mobile terminal may be configured to communicate via any one of a plurality of different networks, each of which may be a wireless communication network directed by a respective network operator. As shown in FIG. 1, for example, a mobile terminal 10 may be configured to communicate with each of N networks, each of which is directed by a respective network operator. For example, the mobile terminal of FIG. 1 may be configured to communicate via a first network 12, a second network 14 . . . an Nth network 16.

A variety of different types of mobile terminals 10 may be configured to communicate with the N networks including, for example, a portable digital assistant (PDA), mobile telephone, smart phone, pager, mobile television, gaming device, laptop computer, camera, tablet computer, touch surface, video recorder, audio/video player, radio, electronic book, positioning device (for example, global positioning system (GPS) device), or any combination of the aforementioned, and other types of voice or data communications systems.

In order to provide for communications with the plurality of different networks, a user of a mobile terminal 10 may have established subscriptions with a plurality of network operators associated with the respective networks. Each subscription defines the terms via which the mobile terminal may communicate with the respective network including, for example, the cost associated with communications supported by the respective network. In order to manage the plurality of subscriptions, the mobile terminal may include a plurality of identification profiles. Each identification profile may define one or more parameters associated with a subscription maintained by the user of the mobile terminal with the network operator of a respective network. Thus, in an instance in which the user of the mobile terminal has subscriptions with N network operators of N different networks, the mobile terminal may accordingly have N network identification profiles, one of which is associated with the subscription with the network operator for each respective network. The terminal may store those profiles on at least one secure module, but a multitude of different secure modules is for compatibility and business reasons possible.

The mobile terminal 10 may include a variety of different types of secure modules including subscriber identity modules (SIMs), universal integrated circuit cards (UICCs), removable user identity modules (R-UIMs), secure digital (SD) cards, embedded UICCs (eUICCs), trusted modules or the like. Those modules then may contain the identification profiles. An identification profile may contain a SIM application, a universal SIM (USIM) application or an internet protocol (IP) multimedia services identity module (ISIM) application and is related to a communication network provider. Other profiles, not related to a communication network provider, may also exist an may be stored by the respective secure module. Regardless of the type, a module includes a memory device configured to store various parameters associated with a profile and the related subscription with a respective network operator including the unique identity of the mobile terminal relative to the network operator within the respective network and an identity of the network or network operator with which the identification profile is associated. With reference to a SIM, for example, the SIM may be configured to store a unique serial number, an international mobile subscriber identity (IASI), security authentication keys and ciphering information, temporary information relating to the respective network, a list of services that the user may access, a personal identification number (PIN) and a personal unblocking code (PUK) for PIN unlocking.

Regardless of the manner in which the mobile terminal 10 is embodied, the mobile terminal may include or otherwise be associated with an apparatus 20 as shown in FIG. 2 that may be configured to manage communications with multiple identification profiles. In an example embodiment, the apparatus may be embodied as shown in FIG. 2 so as to include or otherwise be in communication with a processor 22, a memory device 24, a communication interface 28 and a user interface 30. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. For example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The memory device 24 may include a plurality of secure modules, such as a plurality of SIMs, UICCs, eUICCs, R-UIMs, SD cards, trusted elements or the like. In the illustrated embodiment, the memory device includes a plurality of profiles 26, one of which is associated with each subscription maintained by the user of the mobile terminal with a respective network operator. In the embodiment in which the user maintains subscriptions with N networks as shown in FIG. 1, the memory device may include N identification profiles as shown in FIG. 2.

As noted above, the apparatus 20 may be embodied by a mobile terminal 10. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a user device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 28 that may be any means such as a device or circuitry embodied in either hardware or a combination of hardware and software that is configured to receive and/or transmit data from/to a plurality of networks to facilitate communications with other communications devices. For example, the communications interface may facilitate communications with network entities of one or more radio access networks. In this regard, the communication interface may include, for example, an antenna (or multiple antennas) and supporting hardware and/or software for enabling communications with the wireless communication networks. Additionally or alternatively, the communication interface may include the circuitry for interacting with the antenna(s) to cause transmission of signals via the antenna(s) or to handle receipt of signals received via the antenna(s).

The apparatus 20 of an example embodiment may also include a user interface 30 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In an example embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 24, and/or the like).

Referring now to FIG. 3, the operations performed, such as by the apparatus 20 of FIG. 2 as embodied by or otherwise associated with a mobile terminal 10, in order to manage communications with a plurality of identification profiles 26 are illustrated. As shown in block 40 of FIG. 3, the apparatus may include means, such as the processor 22, the communication interface 28 or the like, for receiving a request for communications from the network operator of a respective network. Information identifying the network operator that provides the request for communications may be provided in association with the request. For example, the request itself may include information identifying the network operator. Alternatively, the apparatus may include means, such as the processor, the communications interface or the like, for receiving an electronic message, such as a text message, a short message service (SMS) message, a multimedia message service (MMS) message, an IM, a chat message or the like, that identifies the network operator. In an instance in which an electronic message that identifies the network operator is provided, the electronic message is provided in association with the request for communications, such as concurrent with the request for communications, immediately preceding or following the request for communication or in a manner in which the electronic message references or otherwise identifies the respective request for communications such that the processor may associate the electronic message and the request for communications.

Based upon the information identifying the network operator that provides the request for communications, the apparatus 20 may include means, such as the processor 22 or the like, for determining the first identification profile 26 that supports communications with the network operator that provided the request for communications. In this regard, the first identification profile is one of a plurality of identification profiles maintained by one or more secure modules. As noted above, each identification profile may include information identifying the network operator or network with which the respective identification profile is associated. Thus, the apparatus, such as the processor, the memory 24 or the like, of the hosting module and mobile terminal 10 may identify the first identification profile that is associated with the network operator that provided the request for communications based upon identity of the network operator that provided the request for communications and the identity of the network or network operator with which the first identification profile is associated.

As shown in block 42 of FIG. 3, the apparatus 20 may also include means, such as the processor 22, the memory 24 or the like, for determining, relative to a predefined criteria, whether the communication should be supported by the first identification profile or by another identification profile. In this regard, the other identification profile may be any one of the plurality of identification profiles of the mobile terminal 10 (other than the first identification profile associated with the network operator that provided the request for communications) with the other identification profiles being associated with subscriptions with other network operators that also support communications, such as via other networks, with the mobile terminal. This way the user can chose the most suitable network operator for his task. The apparatus, such as the processor, the memory or the like, may determine the module and the profile 26 that should support the communication based upon a variety of predefined criteria including, for example, quality of service, a prioritized listing of network operators such as may be provided by the user or an operator, or the like. In an example embodiment, however, the predefined criteria is the cost associated with the communication supported by the different identification profiles. In an example embodiment, the apparatus, such as the processor, the memory or the like, may be configured to accept or reject requests for communications based upon the cost associated with the communications from the requestor such that the requests for communications are accepted or rejected in a manner that reduces and, in one example embodiment, minimizes the costs associated with the communications.

By way of example, the apparatus 20, such as the processor 22, the memory 24 or the like, may be configured to determine whether the costs associated with the communications associated with the first identification profile that is associated with a first network operator that provided the request for communications is the least expensive manner of servicing the request for communications from the requestor. In this example, the apparatus, such as the processor, the memory or the like, may be configured to alternatively determine whether another one of the subscriptions associated with a different identification profile stored on the same or a different module that would provide for communications with the requestor via another network operator would provide a less expensive alternative.

In an instance in which the request for communications may be serviced by the first identification profile in the least expensive manner relative to servicing the communications via the subscriptions associated with the other identification profiles, the apparatus 20 may include means, such as the processor 22, the communications interface 28 or the like, for accepting the request for communications and establishing ongoing communications with the requestor as supported by the first network operator that provided the request for communications. See block 44 of FIG. 3. However, in an instance in which the apparatus, such as the processor, the memory of the like, determines that the communication should be supported by another identification profile, such as in an instance which another identification profile associated with a different network operator may provide for the communications with the requestor in a less expensive manner, the apparatus may include means, such as the processor, the communications interface or the like, for causing the request for communications to be denied. See block 46 of FIG. 3.

In an instance in which the request for communications is denied, the requestor may have a plurality of different numbers, e.g., phone numbers, for the user of the mobile terminal 10 with each number associated with a different subscription of the user of the mobile terminal. Thus, the requestor may simply issue a second request for communications using a different number associated with the user of the mobile terminal and, as a result, relying upon a second subscription of the user of the mobile terminal in an effort to establish communications with the user of the mobile terminal. In this instance, the apparatus 20, such as the processor 22, the memory 24 or the like, may determine whether the identification profile associated with the second subscription of the mobile terminal provides the least expensive mode of communications from among the various subscriptions and, if so, may accept the request for communications. Alternatively, if the apparatus, such as the processor, the memory or the like, determines that the identification profile associated with the second subscription is not the least expensive alternative, the apparatus, such as the processor, the communications interface or the like, may reject the request. In an instance in which the request for communications is again rejected, this process may be repeated with other requests until the request for communications is accepted or until the requestor has attempted to establish communications with each of the numbers associated with the user of the mobile terminal. In an instance in which the request for communications is accepted, the requestor may thereafter identify the number at which the user of the mobile terminal was eventually reached as the preferred number for the user of the mobile terminal to facilitate subsequent requests for communications.

In an example embodiment in which the request for communications is denied, the apparatus 20 may include means, such as a processor 22, the communications interface 28 or the like, for causing information to be provided to the requestor who initiated the request for communications with the information relating to the communications with another network operator that are supported by another identification profile. See block 48 of FIG. 3. In this regard, the apparatus, such as the processor, the memory or the like, may not only determine that the subscription associated with the network operator that provided the initial request for communication is not the least expensive or otherwise does not satisfy the predefined criteria, but the apparatus, such as the processor, the memory or the like, may determine the subscription and, therefore, the identification profile that is associated with the network operator that does satisfy the predefined criteria, such as by being the least expensive communication option. As such, the apparatus may include means, such as the processor, the communications interface or the like, for providing information to the requestor identifying the other subscription and/or the other network operator that have been identified to satisfy the predefined criteria, such as by providing the least expensive communication option. Various types of information identifying the other subscription and/or the other network operator may be provided, but the unique identity, such as the phone number, of the mobile terminal 10 in regards to the other subscription and/or the other network operator may be provided in an example embodiment. Based upon the information regarding the other subscription or the other network operator, the requestor may then place another request for communications via the other subscription or other network operator which would more likely be accepted by the mobile terminal as a result of the request for communications satisfying the predefined criteria.

The information relating to the subscription associated with the other identification profile, such as the subscription that would satisfy the predefined criteria, may be provided in various manners. For example, the apparatus 20, such as the processor 22, the communications interface 28 or the like, may cause an electronic message to be provided to the requestor with the information relating to the subscription associated with the other identification profile that would satisfy the predefined criteria. Various types of electronic messages may be provided including a text message, an SMS message, an MMS message, an IM, a chat message or the like.

While described above in conjunction with the satisfaction of a predefined criteria in the form of a cost of communications, the predefined criteria may include other factors or multiple factors in other example embodiments. For example, the predefined criteria may include both cost and quality in which the subscription and, therefore, the identification profile 26 associated with the least expensive communications option that satisfies a predefined quality requirement may be selected so as to appropriately balance cost and quality of the communications. Other types of predefined criteria may be implemented in other example monuments depending upon the criteria of interest and the manner in which the plurality of subscriptions are defined.

As described above, a method, apparatus 20 and computer program product are therefore provided in order to selectively accept requests for communication that may be supported by different identification profiles 26 with the selective acceptance being based upon a predefined criteria, such as the cost of the communications. As such, the method, apparatus and computer program product of an example embodiment may permit a mobile terminal to more effectively manage subscriptions with a plurality of different network operators in accordance with the predefined criteria, such as in a manner to reduce the overall costs associated with the communications.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of block 48 in FIG. 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
  receiving, at a mobile terminal and from a network operator, a request for communications, wherein communications with the network operator are supported by a first of a plurality of identification profiles;
  determining relative to a predefined criteria, comprising a balance of a cost of a communication and a quality of the communication, of a network, that the communications should not be accepted in association with the first identification profile;

repeating access to at least one of the other of the plurality of identification profiles, responsive to respective repeated communication attempts, until an identification profile is identified that satisfies the predetermined criteria comprising the balance of the cost of the communication and the quality of the communication; and in response to identifying the identification profile that satisfies the predetermined criteria, causing information to be provided to a requestor who initiated the request for communications, and identifying a phone number, associated with the identified profile that satisfies the predetermined criteria, as a preferred number.

2. A method according to claim 1 wherein each of the plurality of identification profiles is associated with a subscription with a respective network operator, and wherein causing information to be provided to the requestor comprises causing information relating to the subscription associated with the another identification profile to be provided to the requestor in an instance in which the communications should be supported by the another identification profile.

3. A method according to claim 2 wherein causing information relating to the subscription associated with the another identification profile to be provided comprises causing an electronic message to be provided to the requestor with information relating to the subscription associated with the another identification profile.

4. A method according to claim 1 wherein the predefined criteria comprises a cost associated with the communications supported by the first identification profile and by the another identification profile.

5. A method according to claim 1 wherein receiving the request for communications comprises receiving information identifying the network operator within the request.

6. A method according to claim 1 further comprising receiving an electronic message associated with the request for communications, wherein the electronic message identifies the network operator.

7. A method according to claim 1, wherein the call sound quality of the cellular network is based at least on a transmission signal quality between a cellular network antenna and a mobile terminal antenna.

8. A method according to claim 1, further comprising:
in an instance in which the communications should be supported by another identification profile and a signal for sending and receiving electronic text messages is not available,
repeating attempts of requests for electronic messaging comprising the information relating to the communications from the another network operator that is supported by the another identification profile until the request for communications is accepted or until the requestor who initiated the request for communications has attempted to establish communications according to the information.

9. A method according to claim 1, wherein the first identification profile and the another identification profile are stored on the same module comprising a subscriber identity module (SIM), universal integrated circuit card (UICC), removable user identity module (R-UIM), or secure digital (SD) card.

10. An apparatus comprising at least one processor and at least one memory including computer program code, the at least one memory and computer program code configured to, with the processor, cause the apparatus to:
receive, from a network operator, a request for communications, wherein communications with the network operator are supported by a first of a plurality of identification profiles;
determine relative to a predefined criteria, comprising a balance of a cost of a communication and a quality of the communication, of a network, that the communications should not be accepted by in association with the first identification profile;
repeat to at least one of the other of the plurality of identification profiles, responsive to respective repeated communication attempts, until an identification profile is identified that satisfies the predetermined criteria comprising the balance of the cost of the communication and the quality of the communication; and
in response to identifying the identification profile that satisfies the predetermined criteria, cause information to be provided to a requestor who initiated the request for communications, and identify a phone number, associated with the identified profile that satisfies the predetermined criteria, as a preferred number.

11. An apparatus according to claim 10 wherein each of the plurality of identification profiles is associated with a subscription with a respective network operator, and wherein the at least one memory and computer program code are configured to, with the processor, cause the apparatus to cause information to be provided to the requestor by causing information relating to the subscription associated with the another identification profile to be provided to the requestor in an instance in which the communications should be supported by the another identification profile.

12. An apparatus according to claim 11 wherein the at least one memory and computer program code are configured to, with the processor, cause the apparatus to cause information relating to the subscription associated with the another identification profile to be provided by causing an electronic message to be provided to the requestor with information relating to the subscription associated with the another identification profile.

13. An apparatus according to claim 10 wherein the predefined criteria comprises a cost associated with the communications supported by the first identification profile and by the another identification profile.

14. An apparatus according to claim 10 wherein the at least one memory and computer program code are configured to, with the processor, cause the apparatus to receive the request for communications by receiving information identifying the network operator within the request.

15. An apparatus according to claim 10 wherein the at least one memory and computer program code are further configured to, with the processor, cause the apparatus to receive an electronic message associated with the request for communications, wherein the electronic message identifies the network operator.

16. A computer program product comprising a non-transitory computer readable medium having program code portions stored thereon, the program code portions configured, upon execution, to:
receive, from a network operator, a request for communications, wherein communications with the network operator are supported by a first of a plurality of identification profiles;
determine relative to a predefined criteria, comprising a balance of a cost of a communication and a quality of the communication, of a network, that the communications should not be accepted in association with the first identification profile; repeat to at least one of the other of the plurality of identification profiles, responsive to respective repeated communication attempts, until an identification profile is identified that satisfies the predetermined criteria comprising the balance of the cost of the communication and the quality of the communication; and in response to identifying the identification profile that satisfies the predetermined criteria, cause information to be provided to a requestor who initiated the request for communications, and identify a phone number, associated with the identified profile that satisfies the predetermined criteria, as a preferred number.

17. A computer program product according to claim 16 wherein each of the plurality of identification profiles is associated with a subscription with a respective network operator, and wherein the program code portions configured to cause information to be provided to the requestor comprise program code portions configured to cause information relating to the subscription associated with the another identification profile to be provided to the requestor in an instance in which the communications should be supported by the another identification profile.

18. A computer program product according to claim 17 wherein the program code portions configured to cause information relating to the subscription associated with the another identification profile to be provided comprise program code portions configured to cause an electronic message to be provided to the requestor with information relating to the subscription associated with the another identification profile.

19. A computer program product according to claim 16 wherein the predefined criteria comprises a cost associated with the communications supported by the first identification profile and by the another identification profile.

20. A computer program product according to claim 16 wherein the program code portions configured to receive the request for communications comprise program code portions configured to receive information identifying the network operator within the request.

* * * * *